US011773641B2

(12) United States Patent
Ramachandran (10) Patent No.: US 11,773,641 B2
(45) Date of Patent: Oct. 3, 2023

(54) INTRUDER RESISTANT SCREEN

(71) Applicant: IPH International Pty Ltd, Yatala (AU)

(72) Inventor: Rameshkumara Ramachandran, Yatala (AU)

(73) Assignee: IPH International Pty Ltd, Yatala (AU)

( * ) Notice: Subject to any disclaimer, the term of this patent is extended or adjusted under 35 U.S.C. 154(b) by 144 days.

(21) Appl. No.: 17/423,594

(22) PCT Filed: Feb. 27, 2020

(86) PCT No.: PCT/AU2020/050177
§ 371 (c)(1),
(2) Date: Jul. 16, 2021

(87) PCT Pub. No.: WO2020/172716
PCT Pub. Date: Sep. 3, 2020

(65) Prior Publication Data
US 2022/0098922 A1 Mar. 31, 2022

(30) Foreign Application Priority Data
Feb. 28, 2019 (AU) .............................. 2019900654

(51) Int. Cl.
*E06B 3/60* (2006.01)
*E06B 3/54* (2006.01)
(Continued)

(52) U.S. Cl.
CPC .............. *E06B 3/60* (2013.01); *E06B 3/26* (2013.01); *E06B 3/549* (2013.01); *E06B 3/9644* (2013.01); *E06B 5/11* (2013.01); *E06B 9/52* (2013.01)

(58) Field of Classification Search
CPC ... E06B 3/60; E06B 3/26; E06B 3/549; E06B 3/9644; E06B 5/11; E06B 9/52; E06B 9/02; F16B 5/0685; F16B 25/103
(Continued)

(56) References Cited

U.S. PATENT DOCUMENTS 1,624,368 A * 4/1927 Schwarz .................. E06B 9/52
160/381
2,335,361 A * 11/1943 Schiller .................... E06B 9/52
160/395
(Continued)

FOREIGN PATENT DOCUMENTS

AU        694515 B       3/1996
DE   102007024240 A1   11/2008
(Continued)

OTHER PUBLICATIONS

International Search Report and Written Opinion for PCT/AU2020/050177 dated Apr. 14, 2020.
(Continued)

*Primary Examiner* — Brent W Herring
(74) *Attorney, Agent, or Firm* — Duane Morris LLP (57) ABSTRACT

An intruder resistant screen providing improved strength. The improved intruder resistant screen comprises a frame, a woven wire intruder resistant mesh covering an opening enclosed by the frame, a plurality of clamp elements engaging with frame members to hold the mesh by a leveraged clamping action and at least one fastener holding each clamping member to the frame member. Each fastener has a drilling portion, a shank portion, a head and a thread. The frame comprises multiple frame members joined by corner stakes and there are two or more clamp elements engaging each frame member.

13 Claims, 11 Drawing Sheets

(51) Int. Cl.
*E06B 3/26* (2006.01)
*E06B 3/964* (2006.01)
*E06B 5/11* (2006.01)
*E06B 9/52* (2006.01)

(58) Field of Classification Search
USPC .......................................... 160/381, 395, 403
See application file for complete search history.

(56) References Cited

U.S. PATENT DOCUMENTS

| | | | | |
|---|---|---|---|---|
| 2,523,383 | A * | 9/1950 | Majkrzak | E06B 9/52 |
| | | | | 160/394 |
| 2,832,407 | A * | 4/1958 | Tracy | E06B 9/52 |
| | | | | 160/371 |
| 3,343,443 | A | 9/1967 | Moore | |
| 5,059,218 | A * | 10/1991 | Pick | E06B 9/52 |
| | | | | 160/381 |
| 5,066,181 | A | 11/1991 | Bogel | |
| 5,119,872 | A * | 6/1992 | Engebretson | E06B 9/04 |
| | | | | 160/381 |
| 5,647,155 | A | 7/1997 | Hillstrom | |
| 6,125,910 | A | 10/2000 | Pepperell et al. | |
| 6,698,987 | B1 | 3/2004 | Dicke | |
| 7,740,048 | B2 * | 6/2010 | Wilson | E06B 9/52 |
| | | | | 160/371 |
| 2004/0173991 | A1 * | 9/2004 | Watterton | A47C 5/04 |
| | | | | 280/281.1 |
| 2011/0114268 | A1 * | 5/2011 | Brabeck | E06B 9/52 |
| | | | | 160/44 |
| 2012/0073771 | A1 | 3/2012 | Dickison et al. | |

FOREIGN PATENT DOCUMENTS

| | | | | |
|---|---|---|---|---|
| DE | 202015100333 | U1 * | 3/2015 | ............ F16B 35/065 |
| EP | 2495458 | B1 | 10/2015 | |
| NO | 333156 | B1 | 3/2013 | |
| WO | 2018204994 | A1 | 11/2018 | |

OTHER PUBLICATIONS

International Preliminary Report on Patentability for PCT/AU2020/050177 dated Jul. 9, 2020.

* cited by examiner

INTRUDER RESISTANT SCREEN

CROSS-REFERENCE TO RELATED APPLICATIONS

This application is a National Stage Application, filed under 35 U.S.C. 371, of International Patent Application No. PCT/AU2020/050177, filed on 27 Feb. 2020, which claims the benefit of Australian Patent Application No. 2019900654, filed 28 Feb. 2019, the entireties of which are incorporated herein by reference.

FIELD OF THE INVENTION

The present invention relates to the field of intruder resistant screening particularly useful for both security and insect screening of windows, doorways, and the like. More particularly, the invention relates to improvements to a known intruder resistant screen that results in improved impact strength and reduced manufacturing time.

BACKGROUND TO THE INVENTION

Reference is made to International Patent Application publication number WO96/07006, which describes an intruder resistant screen, the content of which is incorporated herein by reference. WO96/07006 describes an intruder resistant screen including a frame comprising elongate frame members, each having a channel section engaging a respective corner stake in each end thereof. A woven wire intruder resistant mesh covers an opening enclosed by the frame. There is a clamping member co-acting with respective fasteners and each frame member to thereby clamp the mesh to the frame. The intruder resistant screen described in WO96/07006 is known in the market as the Crimsafe® Security System.

The Crimsafe® Security System achieves intruder resistance, at least in part, due to leveraged clamping between the clamping members and the frame members. The clamping members are held in place by fasteners that are screwed into the frame members. The clamping members extend for the full length of the frame members. To assemble the Crimsafe® Security System holes are drilled in the clamping members, mesh and frame and then screws are screwed into the frame members through the holes in the clamping members.

As far as possible the Crimsafe® Security System uses lightweight components, but the mesh is formed from woven wire. The frame members and clamping members are formed from extruded aluminium. Nonetheless, a standard sized door can be quite heavy and the effort required in construction can be taxing.

SUMMARY OF THE INVENTION

In one form, although it need not be the only or indeed the broadest form, the invention resides in an improved intruder resistant screen comprising:
a frame comprising multiple frame members joined by corner stakes;
a woven wire intruder resistant mesh covering an opening enclosed by the frame;
a plurality of clamp elements engaging with the frame members to hold the mesh by a leveraged clamping action; and
at least one fastener holding each clamp elements to the frame member;
wherein there are two or more clamp elements engaging each frame member; and
wherein each fastener has a drilling portion, a shank portion, a head and a thread.

The frame members are preferably extruded aluminium each having a channel section. The corner stakes suitably engage the channel sections and are held by fixing means, such as screws. The corner stakes may be injection moulded plastic or extruded aluminium.

The clamp elements are suitably carbon fibre reinforced polymer. The carbon fibre reinforced polymer is suitably injection moulded. As an alternative the clamp elements may be die cast aluminium or extruded aluminium. Each clamping member may be relatively short compared to the length of a frame member.

The fasteners are suitably self-drilling screws and preferably have a pan head or countersunk head. The thread preferably extends the length of the shank portion and the drilling portion.

Each clamping member has one or more holes for receiving corresponding fasteners. The holes are preferably countersunk.

Suitably the frame member includes a lip portion and the clamping member includes a complementary hook portion such that engagement of the clamping member to the frame member is by engagement of the complementary hook and lip portions.

In a further form, although again not the only or indeed the broadest form, the invention resides in a method of assembling an improved intruder resistant screen including the steps of:
assembling a frame by fixing corner stakes in each end of a channel of a frame member such that adjacent frame members are held abutting by a corner stake;
locating a woven wire intruder resistant mesh within an opening enclosed by the frame;
engaging a plurality of clamp elements with the frame members so as to apply leveraged clamping to the mesh, there being two or more clamp elements engaging each frame member; and
screwing a self-drilling screw into the frame member through a countersunk hole formed in the clamping member.

Further features and advantages of the present invention will become apparent from the following detailed description.

BRIEF DESCRIPTION OF THE DRAWINGS

To assist in understanding the invention and to enable a person skilled in the art to put the invention into practical effect, preferred embodiments of the invention will be described by way of example only with reference to the accompanying drawings, in which.

DETAILED DESCRIPTION OF THE INVENTION

Embodiments of the present invention reside primarily in an improved intruder resistant screen. Accordingly, the elements of the screen have been illustrated in concise schematic form in the drawings, showing only those specific details that are necessary for understanding the embodiments of the present invention, but so as not to obscure the disclosure with excessive detail that will be readily apparent to those of ordinary skill in the art having the benefit of the present description.

In this specification, adjectives such as first and second, left and right, and the like may be used solely to distinguish one element or action from another element or action without necessarily requiring or implying any actual such relationship or order. Words such as "comprises" or "includes" are intended to define a non-exclusive inclusion, such that a process, method, article, or apparatus that comprises a list of elements does not include only those elements but may include other elements not expressly listed, including elements that are inherent to such a process, method, article, or apparatus.

Figure 1:
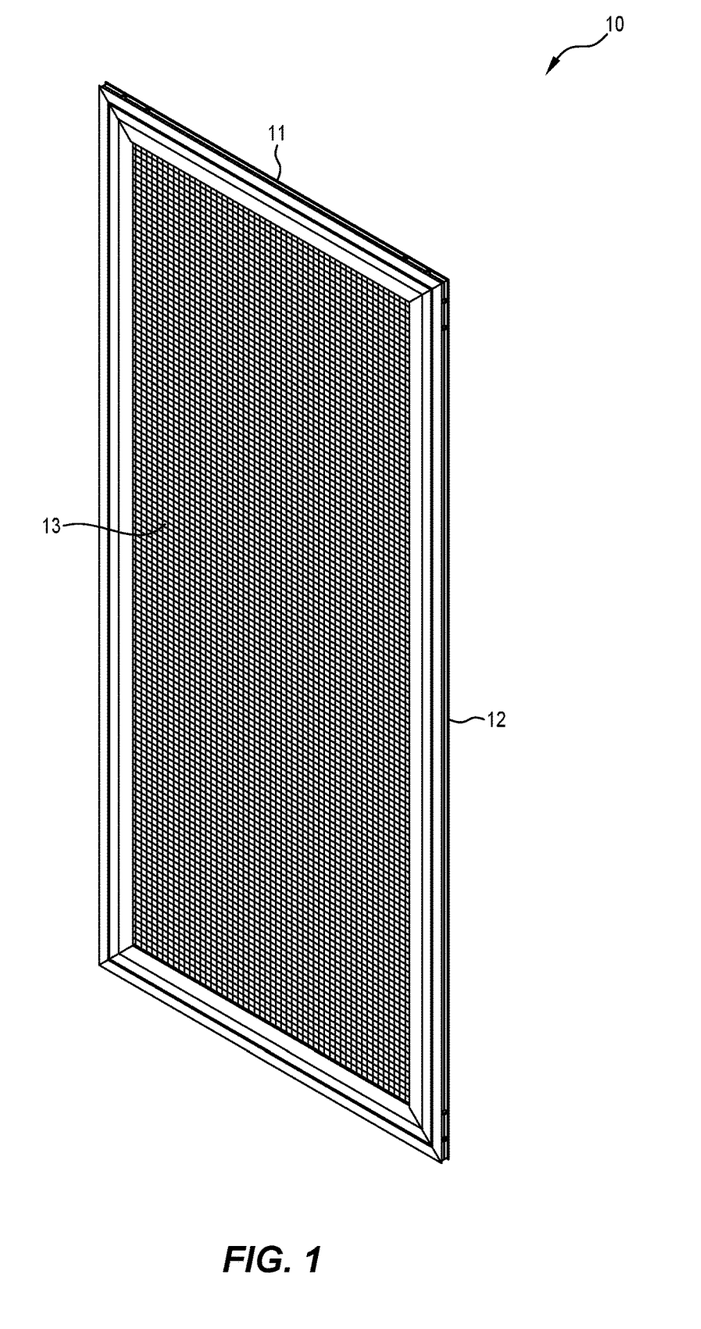
FIG. 1 is a perspective view of an intruder resistant screen.

Referring to FIG. 1 there is a shown an intruder resistant screen 10 having a frame 11 formed from elongate frame members 12. For the door shown there are four elongate frame members forming a rectangle, but other shapes are possible for specific applications. An intruder resistant mesh 13 is held in the frame 11 by a clamping system, as described below. The mesh is suitably woven from stainless steel wire as described in Australian Patent Number 694515, which is incorporated herein by reference. Suitable wire dimensions have been found to be anywhere between about 0.8 mm and 1.2 mm. The wire spacing (in weft or warp) is suitably anywhere from about 1.0 mm to 2.2 mm.

Figure 2:
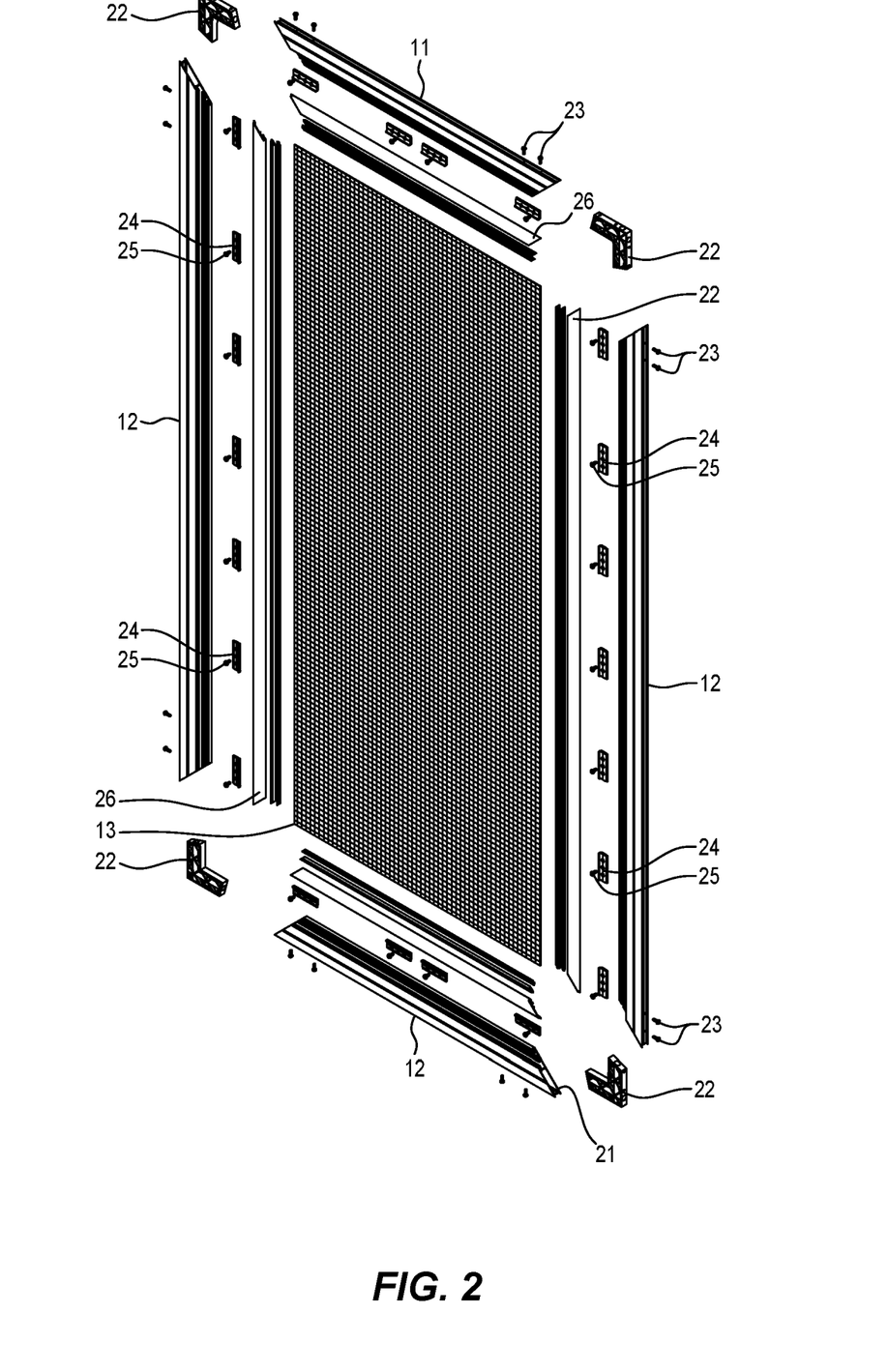
FIG. 2 is an exploded view of the intruder resistant screen of FIG. 1.
Figure 3:
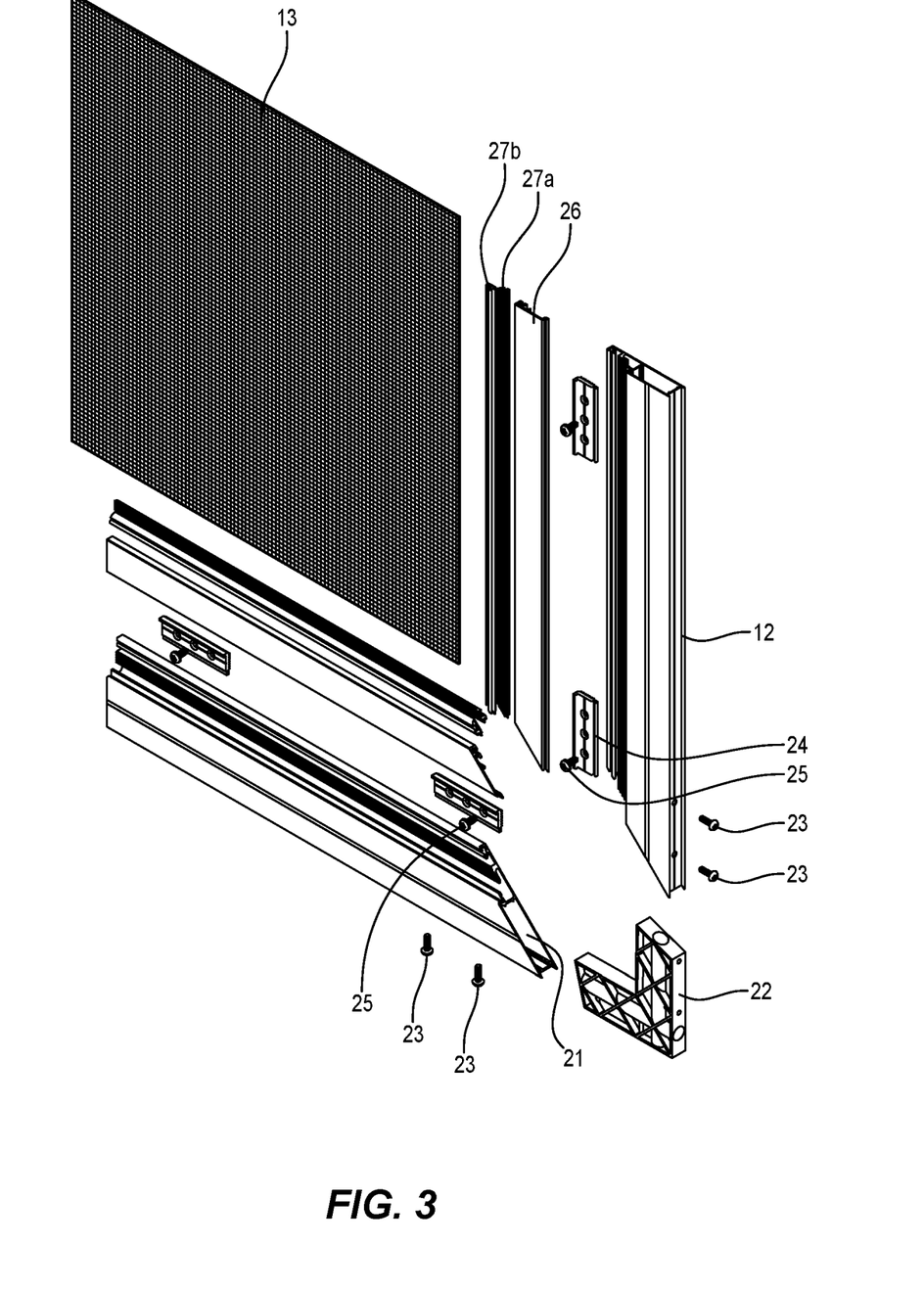
FIG. 3 is an enlarged corner view of a portion of FIG. 2.

Referring to FIG. 2, an exploded view of the intruder resistant screen 10 is shown to display the details of construction. An enlarged portion of FIG. 2 is shown in FIG. 3 to assist understanding. The elongate frame members 12 are suitably aluminium extrusions having a channel section 21 of a size and shape to receive a corner stake 22. The elongate frame members 12 are cut to an appropriate length to fit the opening to be covered and are joined together by inserting the corner stakes 22 into the channel sections 21 and fixing with screws 23.

The mesh 13 is clamped to the frame members 12 by a plurality of short clamp elements such as 24 which are held in place by self-drilling screws 25. A cover 26 clips over the clamp elements 24 to provide a clean appearance. A pair of seals 27a, 27b reduce the ingress of moisture along the mesh 13 and thereby minimise galvanic corrosion.

As clearly seen in FIG. 2, the clamp elements 24 are short compared to the frame members 12. For instance, for a typical domestic door of dimensions 2.0 m high by 0.9 m wide (6 ft×3 ft) there are seven clamp elements on the long side, each about 10 cm long on about 30 cm centre spacing and four clamp elements on the short side with approximately the same size and spacing. As seen on the short sides in FIG. 2, the spacing may be varied to accommodate the door dimensions. Although a length of 10 cm is preferred for the clamp elements 24, other lengths may also be suitable such as 5 cm, 6 cm, 7 cm, 8 cm, 9 cm, 11 cm, 12 cm, 13 cm, 14 cm or 15 cm. Other lengths in the range 5 cm to 15 cm may be used. Similarly, other spacings may also be used in the range from 20 cm to 40 cm including but not limited to 21 cm, 22 cm, 23 cm, 24 cm, 25 cm, 26 cm, 27 cm, 28 cm, 29 cm, 31 cm, 32 cm, 33 cm, 34 cm, 35 cm, 36 cm, 37 cm, 38 cm, or 39 cm.

Figure 4:
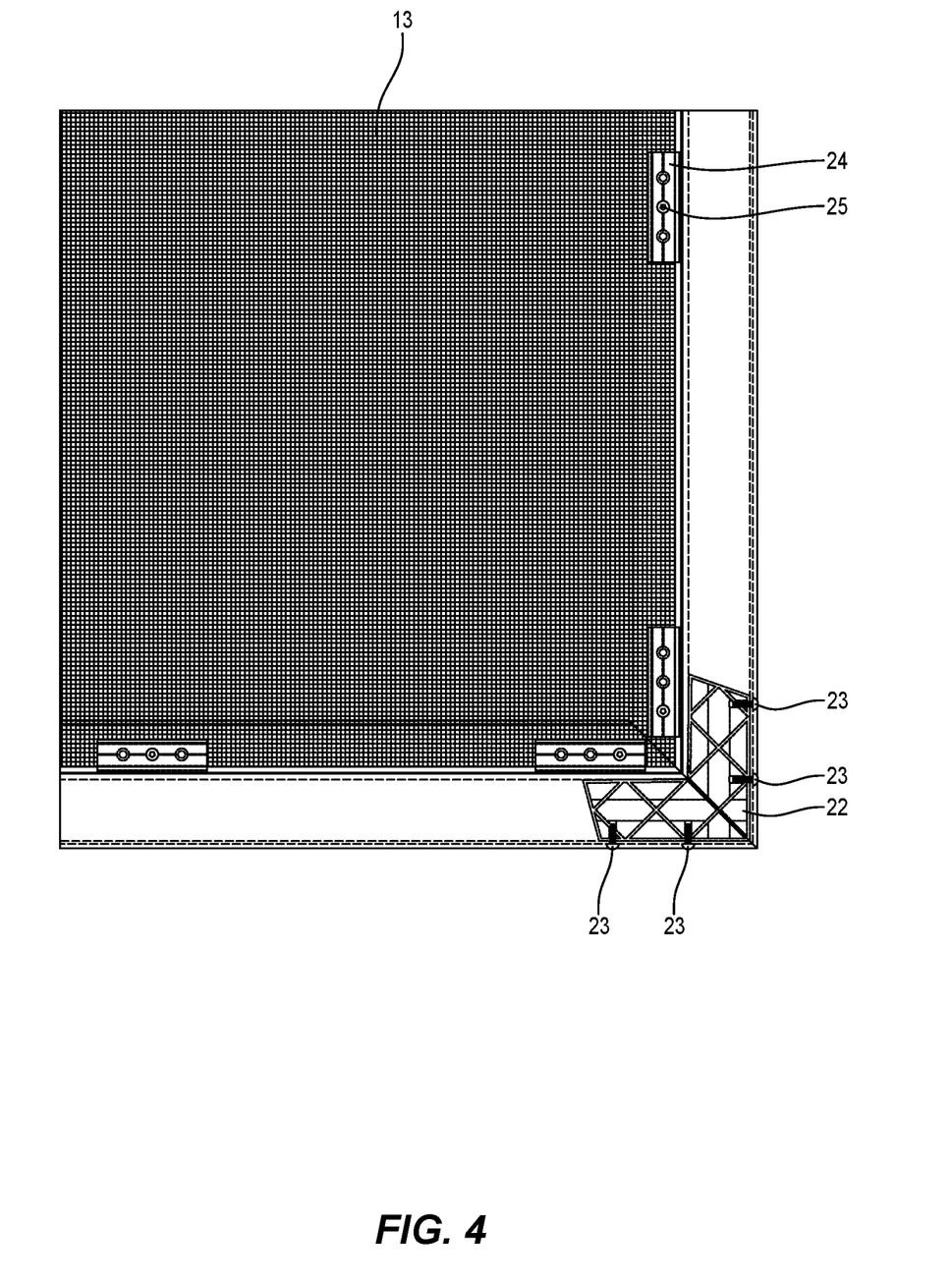
FIG. 4 shows hidden corner detail of a section of FIG. 1.

FIG. 4 displays a portion of an intruder resistant screen showing hidden detail to make clear how the elements are assembled. Clamp elements 24 are located adjacent each corner and additional clamp elements 24 are spaced along the frame member 12. The location of the clamp elements 24 is described in greater detail by reference to FIG. 7.

Figure 5:
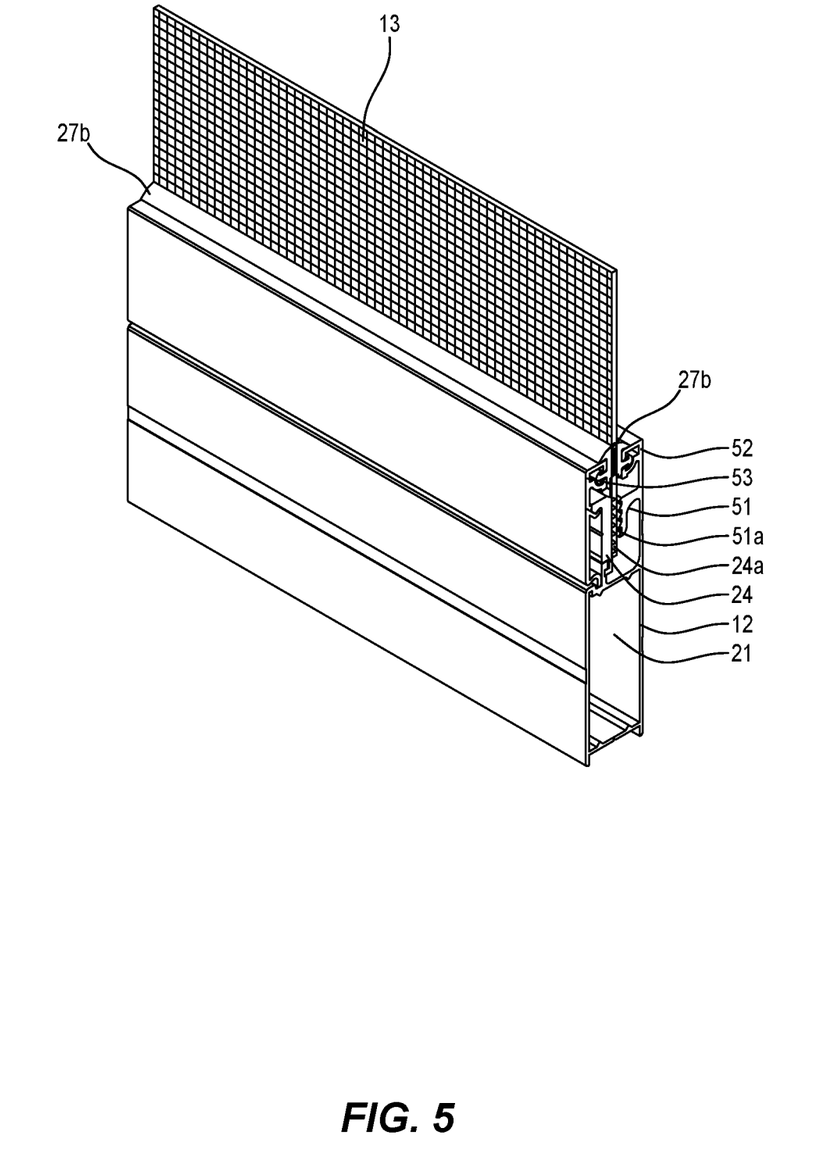
FIG. 5 shows a section of the intruder resistant screen of FIG. 1.

The construction can be seen clearly in the cut away end view of FIG. 5. The elongate frame member 12 is extruded to include a flange 51 that has a serrated surface 51a with serrations that are of a size to restrain the mesh 13. There is also a seal channel 52 that receives the seal 27a. It is convenient for the seal 27a to slide or press into the seal channel 52.

The clamp element 24 may also have a surface 24a with serrations that are of a size to restrain the mesh 13. The clamp element 24 engages the frame member 12 as described in detail below. The cover 26 clips onto the frame member 12 and the clamp element 24. An edge of the cover 26 includes another seal channel 53 which receives seal 27b.

Figure 6:
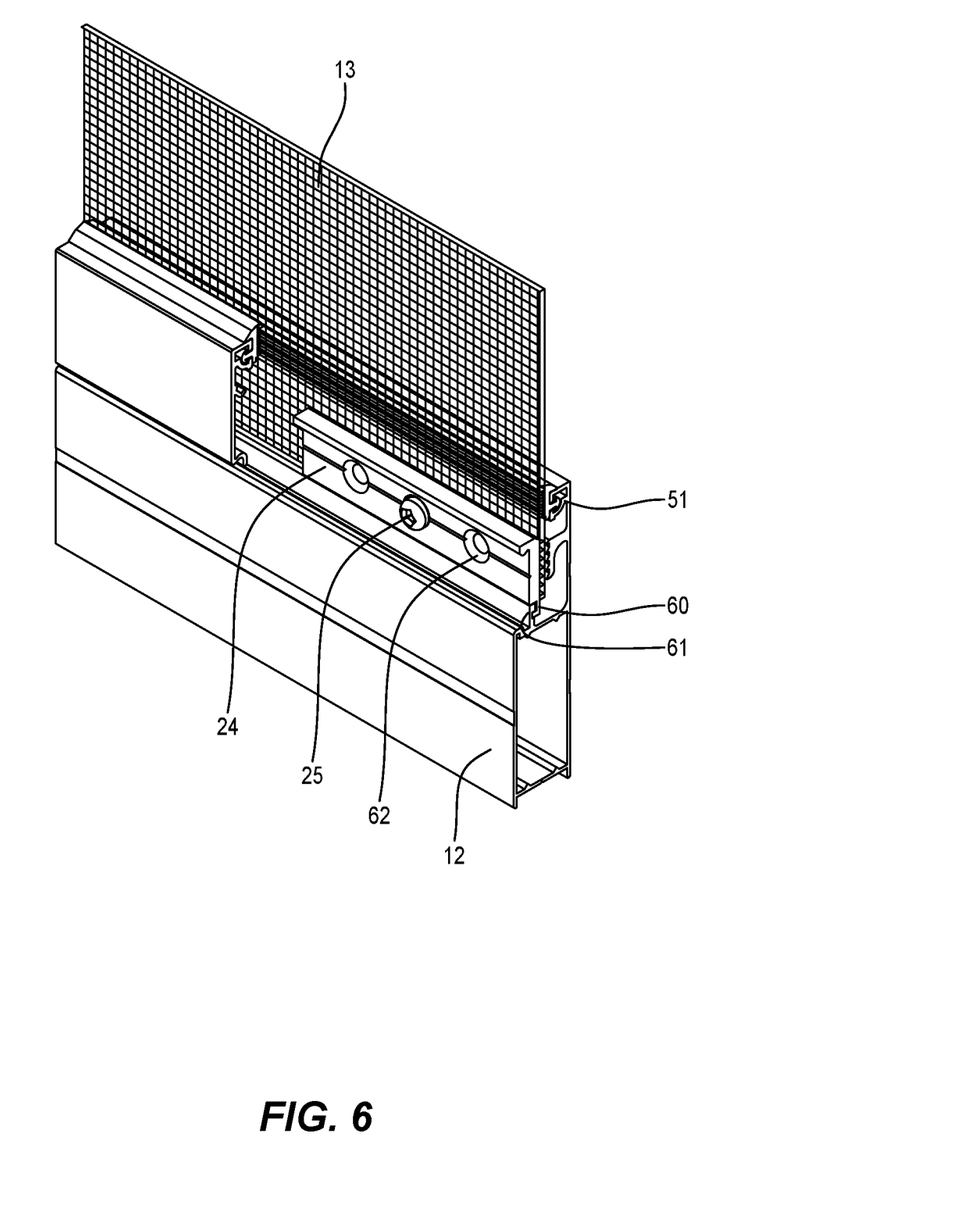
FIG. 6 shows the section of FIG. 5 with a cover removed.

The nature and location of the clamp element 24 is shown more clearly in FIG. 6. Part of the cover 26 has been removed in FIG. 6 to make the whole of clamp element 24 visible. The clamp element 24 is relatively short compared to the length of the elongate frame member 12. This is in sharp contrast to the prior art arrangements referenced above. In the prior art system of AU694515, for instance, the clamping member extends the full length of the elongate frame member. For the current invention there are multiple short clamp elements 24 distributed along the elongate frame member 12, as seen in FIG. 2. In the preferred embodiment, each clamp element 24 is made from carbon fibre reinforced polymer, aluminium extrusion or die-cast aluminium. A suitable carbon fibre reinforced polymer is obtainable from Toray Industries of Japan. However, the clamp element 24 may be produced from other materials with similar tensile strength and flexural strength properties. In some embodiments the clamp elements 24 may be aluminium or an aluminium alloy.

As seen in FIG. 6, the clamp element 24 terminates at one edge with a hook 60 that is captured by a lip 61 formed on the elongate frame member 12. The clamp element 24 is leveraged against the flange 51 to grip the mesh 13. The leverage is provided by a self-drilling screw 25 which passes through a hole 62 in the clamp element 24 and drills through the mesh 13 into the flange 51.

Figure 7:
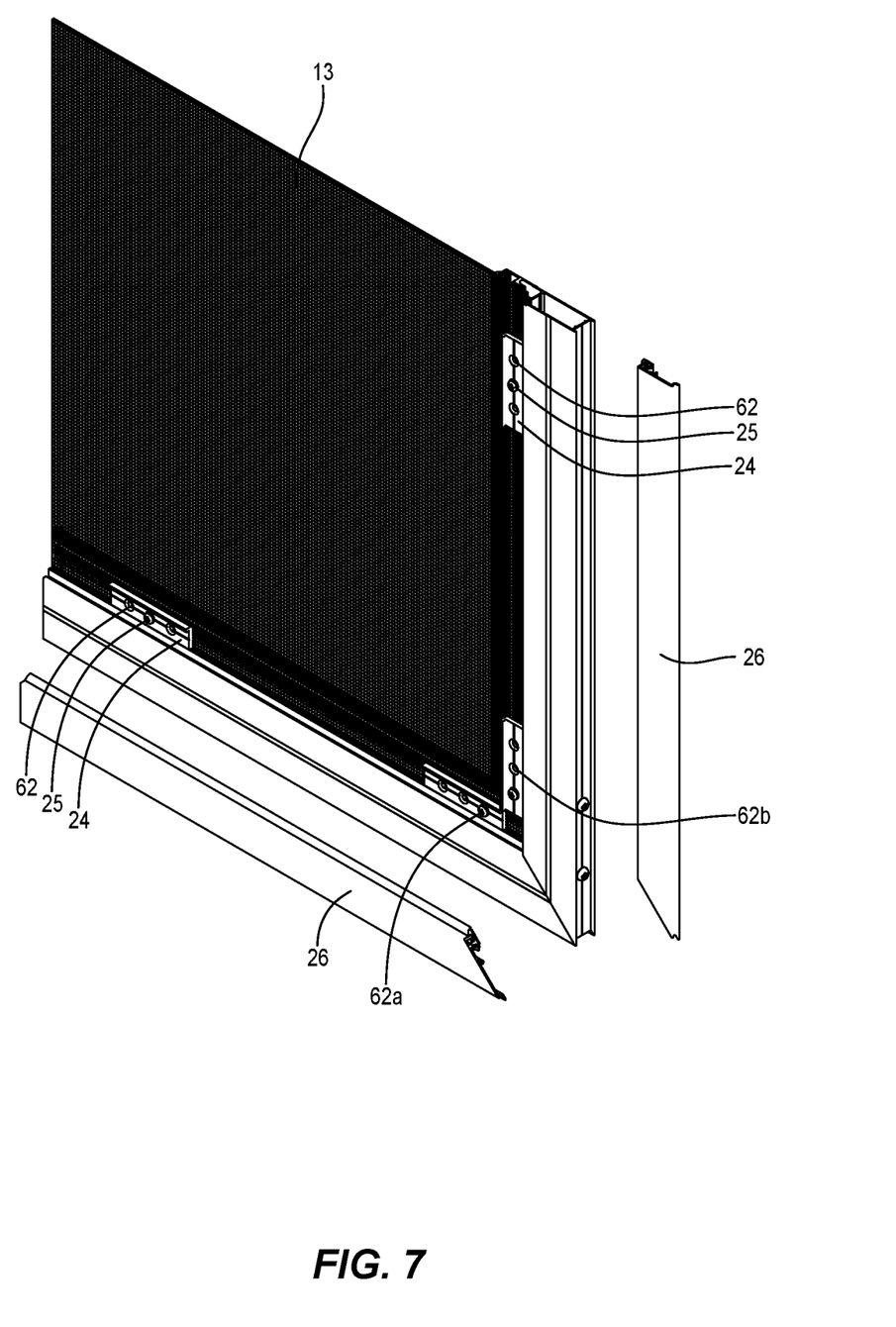
FIG. 7 shows a larger section of the intruder resistant screen of FIG. 1 with a cover removed to show clamp elements.

Turning now to FIG. 7, it can be seen that in the preferred embodiment clamp elements 24 are placed close to each corner of the frame 12 as well as being distributed between the corners. It will be noted that in the preferred embodiment each clamp element 24 has more than one hole 62 for screw 25, and suitably three holes. A length of the clamping element 24 of about 10 cm is sufficient to fit three holes and provide adequate clamping. For clamp elements 24 located near the corners of frame 12 it has been found to be advantageous to use the hole 62a closest to the corner but for the other clamp elements 24 it is preferable to use the middle hole 62b. The provision of multiple holes 62 is for convenience and is not essential to the invention. However, the inventor has found that having multiple holes offers advantages that result in less inventory and more flexibility in manufacturing. Which of the holes 62 is selected depends on the situation. For a corner fixing the hole closest to the corner is used whereas the middle hole is used for clamps away from the corner.

Figure 8:
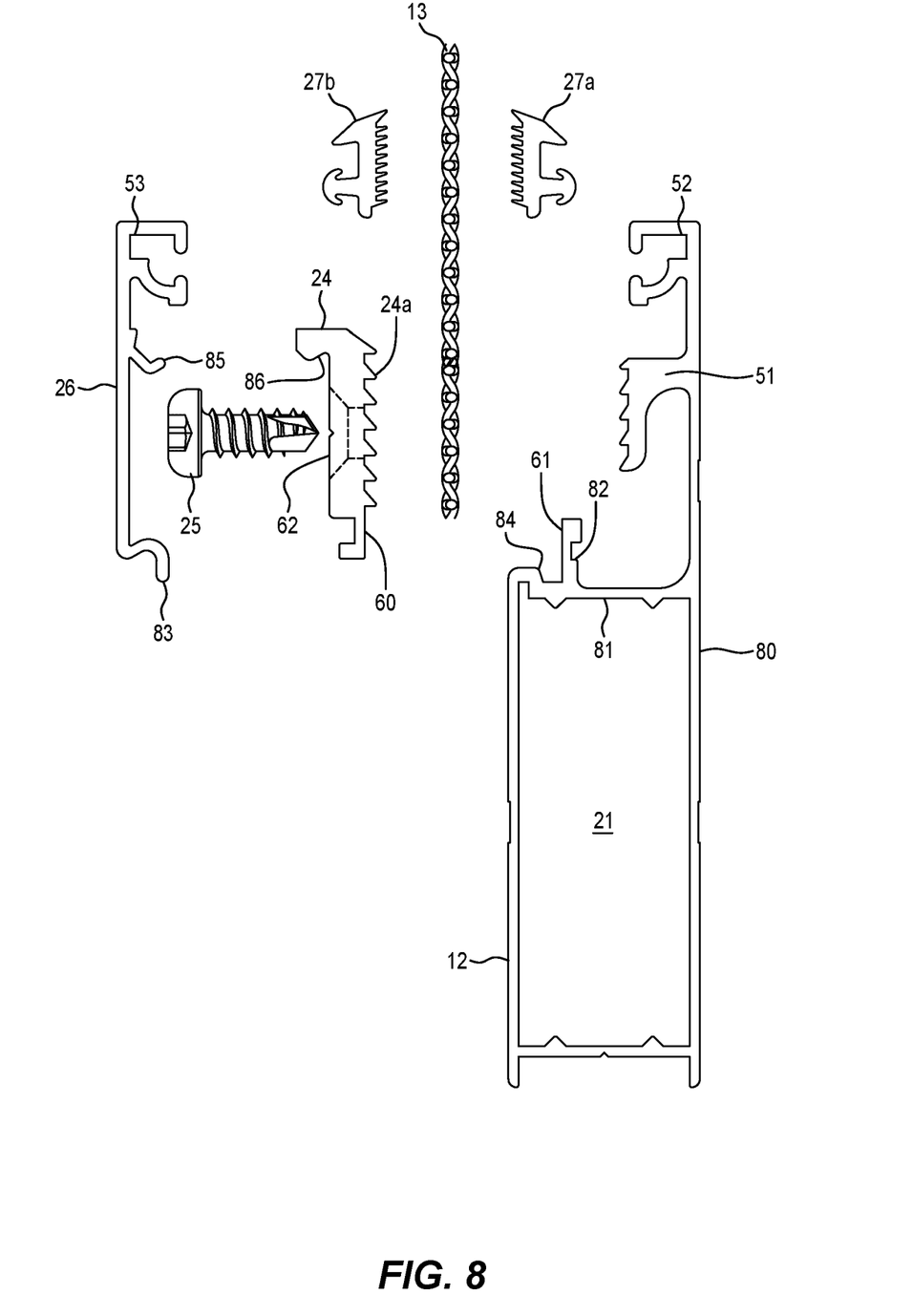
FIG. 8 shows an exploded view before assembly of some of the components of an intruder resistant screen.
Figure 9:
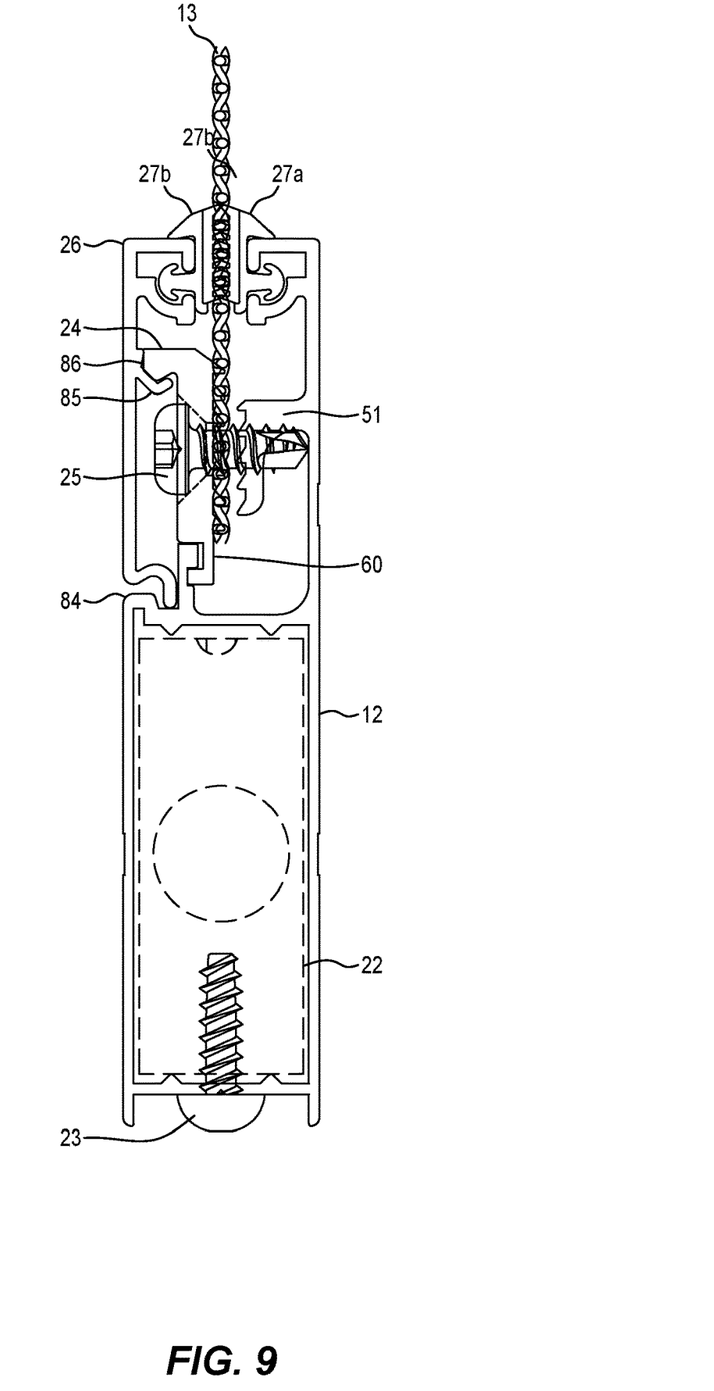
FIG. 9 shows the assembled elements of FIG. 8.
Figure 10:
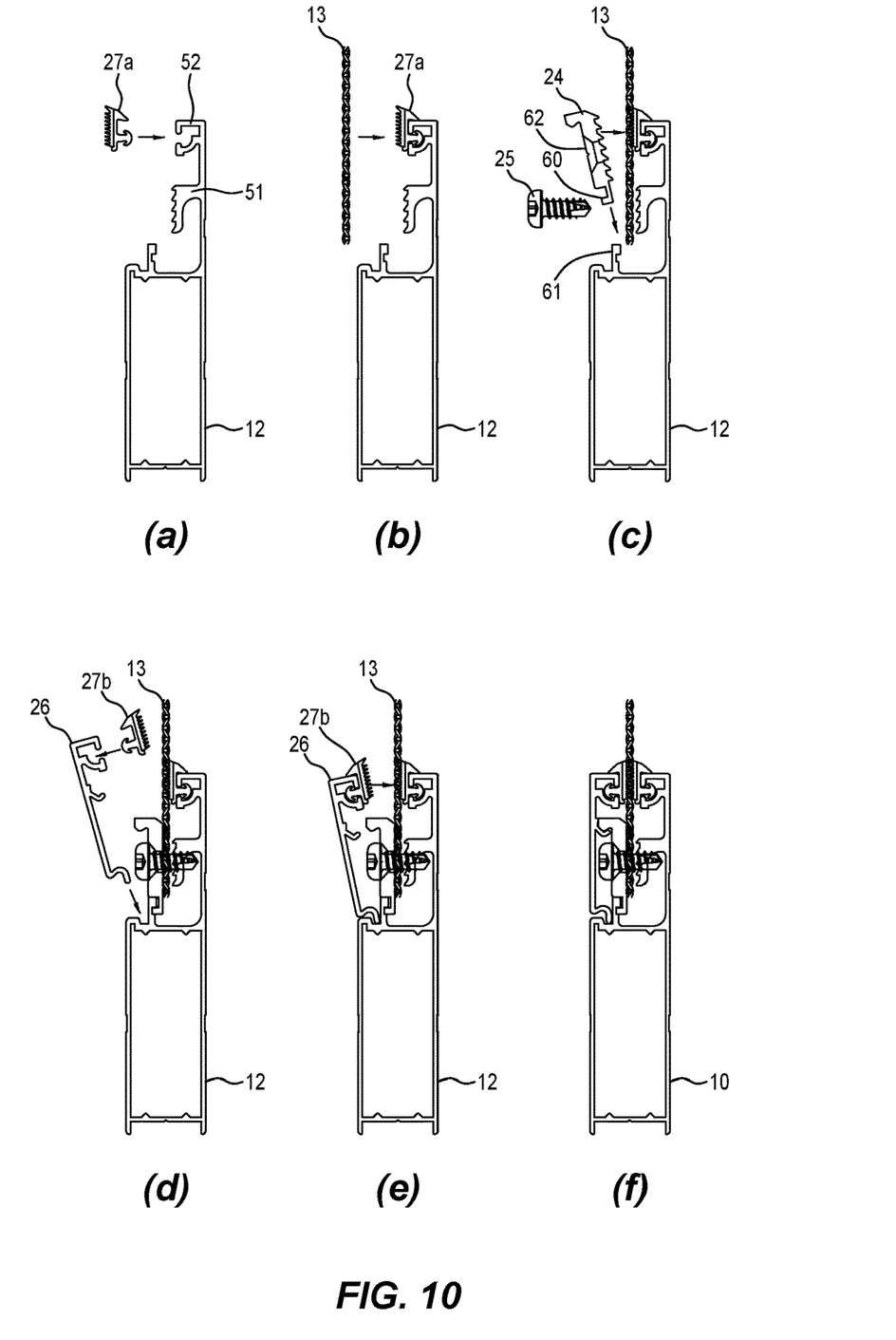
FIG. 10 shows the method of assembly of the clamping member to the frame.

To fully understand the advantages of the improved intruder resistant screen, reference is made to FIGS. 8, 9 and 10 showing the nature and order of assembly. Looking particularly at FIG. 8, the elongate frame member 12 comprises the channel section 21. A wall 80 of the channel section 21 extends to form one side of a clamping assembly. The flange 51 extends away from the wall 80 and includes serrated surface 51a. Extending from another wall 81 is a lip 61 having a groove 82 that forms a catch for the hook 60 of the clamp element 24. At an end of wall 80 is a channel 52 that receives a seal element 27a that co-acts with seal element 27b to form a seal to inhibit ingress of moisture along the mesh 13. The clamp element 24 has a serrated surface 24a that is similar to the serrated surface 51a. A hole 62 in the clamp element 24 receives screw 25. A cover 26 has at one side an edge 83 that engages a rim 84 on the frame member 12 and towards an opposite side a hook 85 that engages a clip 86 on the clamp element 24. At an edge of the cover 26 is a channel 53 that receives seal element 27b.

FIG. 9 shows the elements of FIG. 8 assembled together. The hook 60 of the clamp element 24 is engaged with the lip 61 of the frame member 12. The screw 25 urges the clamp element 24 towards the flange 51 so as to hold the mesh 13 in place by leveraged clamping. The cover 26 clips under the rim 84 and the clip 86. The seal elements 27a, 27b cooperate to seal against the mesh 13 to inhibit ingress of moisture and therefore minimise galvanic corrosion between the stainless steel mesh and the aluminium frame. For completeness a screw 23 is shown holding the corner stake 22. Screw 23 is a conventional round head metal thread screw as is known.

A sequence of assembly is shown in FIG. 10. As shown in FIG. 10(a) the first step is to fit the seal element 27a, which is fitted to the channel 52. Then, as seen in FIG. 10(b) the mesh 13 is located against the seal element 27a. The clamp element 24 is then located with the hook 60 under the lip 61 as shown in FIG. 10(c) and the screw 25 is drilled through the hole 62 into the flange 51. The seal element 27b is fitted to the cover 26 which is then fitted to the elongate frame member 12 as shown in FIG. 10(d), The cover 26 is snapped in place by pushing as showing FIG. 10(e) and FIG. 10(f) shows the finally assembled intruder resistant screen 10.

Figure 11:
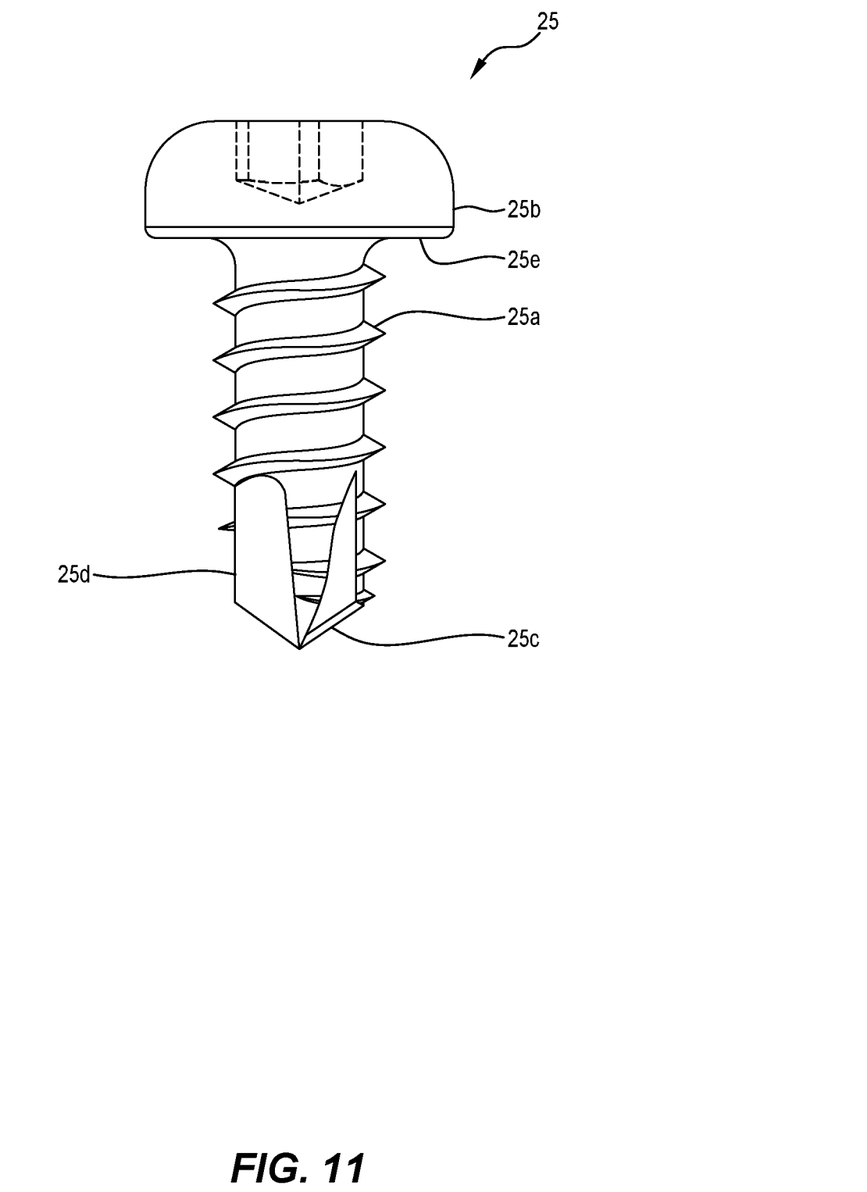
FIG. 11 shows the fastener used to hold each clamping member to the frame.

The inventor has found that it is useful to use a screw 25 of the type shown in FIG. 11. Unlike known screws the screw 25 is self-drilling with a thread 25a that extends from the head 25b to the tip 25c, including along the drill portion 25d. This screw design is unknown since it is generally considered that the drill portion 25d cannot make a contribution to the holding strength of the screw 25. However, at least part of the thread in the drill portion 25d engages the flange 51, thus providing additional holding strength to the intruder resistant screen 10.

Also relevant is that the screw head 25b is a round head with a flat underside 25e although the hole 62 in the clamp element 24 is countersunk. It has been found that the combination of a thread on the drill portion together with a round head screw and a countersunk hole provides additional strength compared to the absence of these features. The inventors have found that flat underside 25e when seated against the countersunk part gives the required impact performance, as shown in FIG. 9. They speculate that part of the extra strength is provided by the additional holding strength of the thread 25d engaging the flange 51, but also that the flat underside 25e of screw head 25b with the countersunk hole 62 allows for additional flexure. The additional flexure permits some movement of the clamp member 24 before failure, thus providing additional strength against impact.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this invention is intended to embrace all alternatives, modifications and variations of the present invention that have been discussed herein, and other embodiments that fall within the spirit and scope of the above described invention.

The invention claimed is:

1. An improved intruder resistant screen comprising:
    a frame comprising multiple frame members joined by corner stakes;
    a woven wire intruder resistant mesh covering an opening enclosed by the frame;
    a plurality of clamp elements made of carbon fibre reinforced polymer engaging with the frame members to hold the mesh by a leveraged clamping action; and
    at least one fastener holding each clamp element to the frame member;
    wherein there are two or more clamp elements engaging each frame member; and
    wherein each fastener has a drilling portion, a shank portion, a head and a thread.

2. The improved intruder resistant screen of claim 1 wherein the clamp elements are relatively short compared to the length of a frame member.

3. The improved intruder resistant screen of claim 1 wherein the fasteners are self-drilling screws with the thread that extends the length of the shank portion and the drilling portion.

4. The improved intruder resistant screen of claim 1 wherein the frame members are extruded aluminium each having a channel section.

5. The improved intruder resistant screen of claim 1 wherein the corner stakes engage the channel sections and are held by fixing means.

6. The improved intruder resistant screen of claim 1 wherein the corner stakes are injection moulded plastic.

7. The improved intruder resistant screen of claim 1 wherein the corner stakes are extruded aluminium.

8. The improved intruder resistant screen of claim 1 wherein the clamp elements are injection moulded.

9. The improved intruder resistant screen of claim 1 wherein the fasteners have a pan head or countersunk head.

10. The improved intruder resistant screen of claim 1 wherein each clamp element has one or more holes for receiving corresponding fasteners.

11. The improved intruder resistant screen of claim 10 wherein the holes are countersunk.

12. The improved intruder resistant screen of claim 1 wherein the frame member includes a lip portion and the clamp element includes a complementary hook portion such that engagement of the clamp element to the frame member is by engagement of the complementary hook and lip portions.

13. A method of assembling an improved intruder resistant screen including the steps of:
- assembling a frame by fixing corner stakes in each end of a channel of a frame member such that adjacent frame members are held abutting by a corner stake;
- locating a woven wire intruder resistant mesh within an opening enclosed by the frame;
- engaging a plurality of carbon fibre reinforced polymer clamp elements with the frame members so as to apply leveraged clamping to the mesh, there being two or more clamp elements engaging each frame member; and
- screwing a self-drilling screw into the frame member through a countersunk hole formed in the carbon fibre reinforced polymer clamping element.

* * * * *